US009391488B1

(12) United States Patent
Kodani et al.

(10) Patent No.: US 9,391,488 B1
(45) Date of Patent: Jul. 12, 2016

(54) ROTARY BODY DRIVING APPARATUS

(71) Applicant: Shinano Kenshi Kabushiki Kaisha, Ueda-shi, Nagano (JP)

(72) Inventors: Masayuki Kodani, Ueda (JP); Nobuchika Maruyama, Ueda (JP)

(73) Assignee: SHINANO KENSHI KABUSHIKI KAISHA, Ueda-Shi, Nagano (JP)

( * ) Notice: Subject to any disclaimer, the term of this patent is extended or adjusted under 35 U.S.C. 154(b) by 0 days.

(21) Appl. No.: 14/949,309

(22) Filed: Nov. 23, 2015

(30) Foreign Application Priority Data

Dec. 17, 2014 (JP) ................................. 2014-255286

(51) Int. Cl.
| | |
|---|---|
| G02B 26/08 | (2006.01) |
| H02K 7/00 | (2006.01) |
| H02K 11/00 | (2016.01) |
| H02K 5/16 | (2006.01) |
| H02K 1/22 | (2006.01) |
| G02B 26/12 | (2006.01) |

(52) U.S. Cl.
CPC .............. *H02K 7/003* (2013.01); *G02B 26/121* (2013.01); *H02K 1/22* (2013.01); *H02K 5/161* (2013.01); *H02K 11/0015* (2013.01); *H02K 11/0021* (2013.01); *H02K 11/0094* (2013.01)

(58) Field of Classification Search
CPC ..... H02K 11/33; H02K 29/08; G02B 26/121; G02B 26/122; G02B 5/09
USPC ................ 359/200.1, 216.1–219.2, 850, 855; 310/40 R, 46, 48, 66; 347/243, 347/259–261
See application file for complete search history.

(56) References Cited

U.S. PATENT DOCUMENTS

| | | | |
|---|---|---|---|
| 4,836,631 A | 6/1989 | Shimazu et al. | |
| 2006/0139442 A1* | 6/2006 | Kurita | ................... G02B 26/121 347/261 |

FOREIGN PATENT DOCUMENTS

| | | | |
|---|---|---|---|
| EP | 1 115 022 | | 7/2001 |
| JP | 61-88480 | | 6/1986 |
| JP | H02 60449 | | 2/1990 |
| JP | H08 62527 | | 3/1996 |
| JP | 2 902514 | | 6/1999 |
| JP | 2004062083 | * | 2/2004 |

OTHER PUBLICATIONS

Extended European Search Report for corresponding European Patent Application No. 15193685.3.

* cited by examiner

Primary Examiner — James Phan
(74) Attorney, Agent, or Firm — Stephen J. Weyer, Esq.; Stites & Harbison, PLLC.

(57) ABSTRACT

The rotary body driving apparatus comprises: a rotary body having a plurality of reflective surfaces; a rotor being attached to a rotor shaft together with the rotary body; a stator housing having a bearing section; a motor substrate for detecting a rotational position of the rotor; a circular magnetized section for frequency generation facing the motor substrate; a circular frequency generation pattern, which faces the magnetized section, being provided to the motor substrate and disposed close to the magnetized section; a position detecting section, which corresponds to a reference reflective surface of the rotary body, being radially outwardly or inwardly projected from a part of the magnetized section; and a magnetic sensor, which faces the position detecting section, being provided to the motor substrate.

4 Claims, 2 Drawing Sheets

ROTARY BODY DRIVING APPARATUS

CROSS-REFERENCE TO RELATED APPLICATION

This application is based upon and claims the benefit of priority of the prior Japanese Patent Application No. 2014-255286, filed on Dec. 17, 2014, and the entire contents of which are incorporated herein by reference.

FIELD

The present invention relates to a rotary body driving apparatus, in which a rotary body, e.g., tilt mirror, polygon mirror, is attached to a rotor shaft together with the rotor.

BACKGROUND

In a rotor of an outer rotor-type driving apparatus, a cup-shaped rotor yoke is integrally attached to one end part of a rotor shaft, and the rotor shaft is rotatably held by a stator housing. A circular rotor magnet is provided inside of a rotor yoke, and the rotor magnet is set to face pole teeth of a stator iron core assembled in the stator housing.

A position detecting magnet, which is separated from a rotor magnet and which is used for detecting a rotational position of the rotor, is provided to a part of an outer circumferential surface of a rotor yoke. A rotational position of the position detecting magnet is detected by a magnetic sensor, e.g., Hall IC, so that the rotational position of the rotor can be detected (see Patent Document 1).

PRIOR ART DOCUMENT

Patent Document 1: Japanese Laid-open Utility Model Publication No. 61-88480

SUMMARY

However, in case of using the position detecting magnet separated from the rotor magnet as described in Patent Document 1, number of parts and number of production steps must be increased, so a production cost of the rotary body driving apparatus must be increased.

In case of providing the position detecting magnet separated from the driving magnet, e.g., rotor magnet, or providing a projected magnet section for detecting a rotational position of the rotor, a torque ripple of the position detecting magnet or the projected magnet section must be increased, and rotational stability of the rotor will be badly influenced.

Further, in case of employing, for example, a rotary body having a plurality of reflective surfaces as a load integrally attached to the rotor, a reference reflective surface must be detected.

The present invention has been invented to solve the above described problems of the conventional technology.

Accordingly, an object of the present invention is to provide a rotary body driving apparatus, in which a position detecting section is provided to a part of a rotary body acting as a load such that the position detecting section corresponds to a reference reflective surface of the rotary body so as to improve rotational stability and rotational controllability of the apparatus.

To achieve the object, the present invention has following structures.

Namely, the rotary body driving apparatus of the present invention basically comprises:

a rotary body having a plurality of reflective surfaces;

a motor having a rotor shaft;

a rotor being attached to one end part of the rotor shaft together with the rotary body;

a stator housing having a bearing section, which rotatably holds the rotor shaft;

a motor substrate for detecting a rotational position of the rotor, the motor substrate being provided to the stator housing;

a magnetized section for frequency generation, the magnetized section being formed into a ring shape and provided to an outer edge of an end surface of the rotary body facing the motor substrate;

a circular frequency generation pattern, which faces the magnetized section, being provided to the motor substrate and disposed close to the magnetized section;

a position detecting section, which is magnetized and which corresponds to a reference reflective surface of the rotary body, being radially outwardly or inwardly projected from a part of the magnetized section; and a magnetic sensor, which faces the position detecting section, being provided to the motor substrate.

As described above, the position detecting section, which is magnetized and which corresponds to the reference reflective surface of the rotary body acting as a load, is radially outwardly or inwardly projected from the part of the magnetized section, which is formed into the ring shape and provided to the outer edge of the end surface of the rotary body facing the motor substrate. With this structure, rotational stability and rotational controllability of the rotary body driving apparatus can be improved by making the position detecting section, which is provided to the part of the magnetized section, correspond to the reference reflective surface. Further, the magnetized section is directly provided to the outer edge of the end surface of the rotary body facing the motor substrate, and the frequency generation pattern is provided to the motor substrate and disposed close to the magnetized section, so that the rotational position of the rotor can be highly precisely detected.

In the rotary body driving apparatus, the rotary body may be formed into a multiple truncated pyramid shape, the reflective surfaces may be formed in outer surfaces of the rotary body, and the magnetized section may be integrally attached to an outer edge of an axially maximum width part of the rotary body.

With this structure, in comparison with a case of providing the magnetized section to a rotor yoke, an outer diameter of the magnetized section (FG magnet) can be increased as much as possible, number of magnetic poles of the magnetized section can be increased, an outer diameter of the frequency generation pattern can be increased, and numbers of generation wire elements and connection wire elements can be increased, so that the rotational position of the rotary body can be highly precisely detected.

Preferably, the magnetized section is integrally attached to the rotary body with a back yoke composed of a magnetic material.

With this structure, a magnetic flux path caused by the magnetized section (FG magnet) can be expanded, so that number of magnetic fluxes interlinking the frequency generation pattern (FG pattern) can be increased and detection sensitivity can be improved.

In the rotary body driving apparatus, the rotary body may be a tilt mirror having a plurality of tilted reflective surfaces or a polygon mirror having a plurality of reflective surfaces, and the tilt mirror or the polygon mirror may be integrally attached to a rotor yoke and retained in an axial direction.

In this case, controllability of the mirror can be improved by highly precisely detecting the rotational position of the tilt mirror or the polygon mirror with respect to rotational reference surfaces thereof.

In the rotary body driving apparatus of the present invention, the rotary body and the rotor, which act as a load, are assembled in a state where the rotational reference positions are correctly aligned, so that rotational stability and rotational controllability of the rotary body driving apparatus can be improved.

BRIEF DESCRIPTION OF THE DRAWINGS

Embodiments of the present invention will now be described by way of examples and with reference to the accompanying drawings which are given by way of illustration only, and thus are not limitative of the present invention, and in which.

DESCRIPTION OF THE EMBODIMENTS

Preferred embodiments of an optical scanner, which is an example of a rotary body driving apparatus relating to the present invention, will now be described in detail with reference to the accompanying drawings. Firstly, the optical scanner, which reflects and irradiates a laser beam emitted from a laser irradiation unit in a wide range so as to measure a distance, e.g., an inter-vehicle distance, a distance to an obstacle, will be explained.

Figure 1:
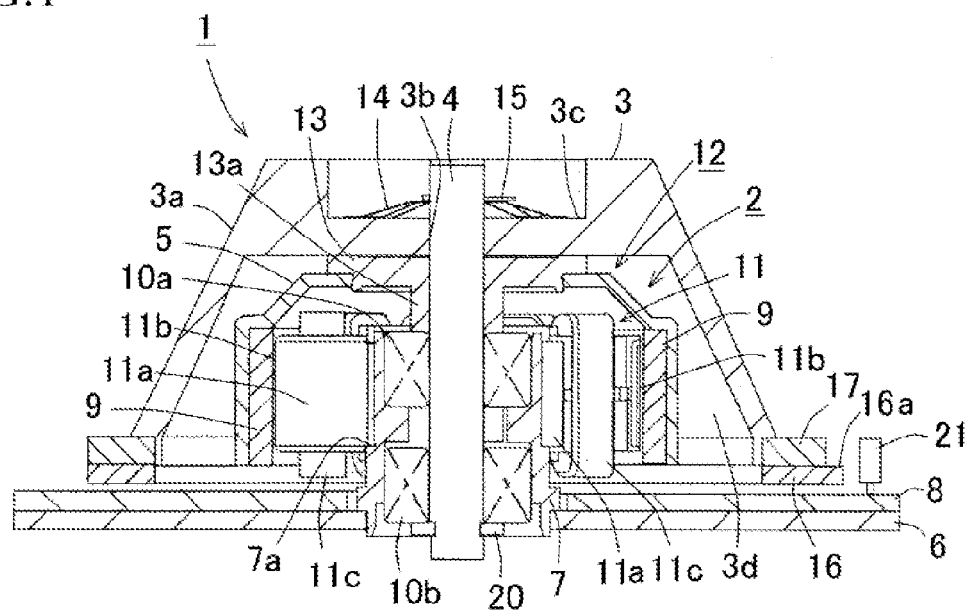
FIG. 1 is an axially sectional view of an optical scanner.

As shown in FIG. 1, in the optical scanner 1, a tilt mirror (rotary body) 3 having, for example, four reflective surfaces 3a, which are outer side surfaces and whose inclination angles are different from each other, is attached to one end part of a rotor shaft 4 of a motor 2 (see FIG. 2) together with a rotor yoke 5. The tilt mirror 3 and the rotor yoke 5 are prohibited from detaching from and rotating with respect to the rotor shaft 4.

Figure 4:
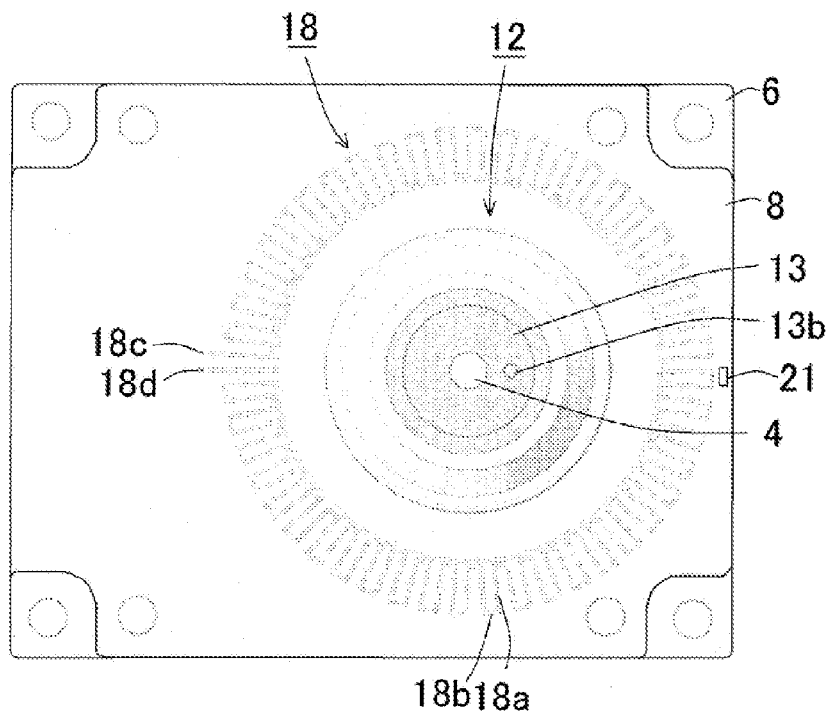
FIG. 4 is a plan view of a motor substrate shown in FIG. 1, on which a motor is mounted.

Firstly, a structure of the motor 2 will be explained. As shown in FIG. 4, a bearing housing 7 (stator housing 7) is integrally attached to a base plate 6. A motor substrate 8, on which a Hall IC for detecting magnetic poles of a rotor magnet 9, etc. are mounted, is attached on the base plate 6.

A first bearing section 10a and a second bearing section 10b are attached in the bearing housing 7 which is formed into a cylindrical shape. For example, the first bearing section 10a and the second bearing section 10b are rolling bearings. A step-shaped part 7a is formed in an outer surface of the bearing housing 7. A stator 11 is attached to the step-shaped part 7a. In the stator 11, a stator core 11a is covered with insulators and motor coils 11c are respectively wound on magnetic pole teeth 11b. The stator core 11a is fixed to the bearing housing 7 by press fit and adhesive.

The rotor shaft 4 of a rotor 12 is rotatably held by the first bearing section 10a and the second bearing section 10b which are provided in the bearing housing 7. The cylindrical rotor yoke 5 and a rotor hub 13 are integrated with each other by caulking. A cylindrical sleeve 13a is axially extended from a center part of the rotor hub 13 toward the rotor yoke 5. The rotor shaft 4 is integrally fitted into the hole of the sleeve 5c by press fit, shrink fit, adhesive, etc. A projection 13b (see FIG. 2) is provided on an axially opposite side of the sleeve 13a of the rotor hub 13. A plurality of the projections 13b may be formed. The rotor magnet 9 is integrally attached on an inner circumferential surface of the rotor yoke 5. In the rotor magnet 9, magnetic N-poles and magnetic S-poles are alternately formed and faced to the pole teeth 11b of the stator 11.

The tilt mirror 3 is integrated with the rotor 11. As shown in FIG. 1, the tilt mirror 3 is formed into a multiple truncated pyramid shape and has a plurality of the reflective surfaces (e.g., four reflective surfaces) 3a, which are outer side surfaces and whose inclination angles are different from each other. A shaft hole (through-hole) 3b, through which the rotor shaft 4 is penetrated, is formed at a center part of the tilt mirror 3. In an upper surface of the tilt mirror 3, a recessed part 3c is formed around the shaft hole 3b. One end of the rotor shaft 4 is inserted into the recessed part 3c, and a press spring 14 and a retaining washer 15 are fitted therein so as to attach the tilt mirror 3 to the rotor shaft 4 without being detached. With this structure, an axial assembling space of the tilt mirror 3 can be made small.

The reflective surfaces 3a of the tilt mirror 3 are mirror surfaces, which are formed by vapor-depositing metal on a material of the tilt mirror 3, e.g., metallic material, resin material, or by polishing the material. Further, in the tilt mirror 3, an accommodating part 3d, which is a recessed part and capable of accommodating the rotor yoke 5, is formed in a bottom surface facing the motor 2.

Figure 3:
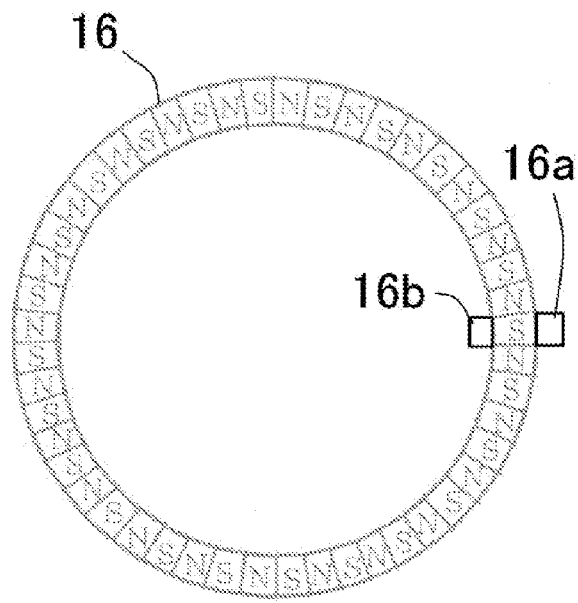
FIG. 3 is a plan view of an FG magnet shown in FIG. 1.

As shown in FIG. 1, a circular magnetized section (FG magnet) 16 is integrally attached to a lower surface of the tilt mirror 3 having the reflective surfaces 3a, i.e., along an outer edge of an axially maximum width part of the tilt mirror 3, with a back yoke 17 composed of a magnetic material. Note that, the back yoke 17 may be omitted. The FG magnet 16 is directly integrated with the outer edge of the lower end surface of the tilt mirror 3, which faces the motor substrate 8. As shown in FIG. 3, in the circular FG magnet 16, magnetic N-poles and magnetic S-poles are alternately formed. Number of the magnetic poles of the FG magnet 16, e.g., 120, is much greater than that of the rotor magnet 9.

As shown in FIG. 4, a frequency generation pattern (FG pattern) 18 is formed on a surface of the motor substrate 8, which faces the FG magnet 16. The FG pattern 18 is constituted by: a pattern of generation wire elements 18a, which are radially formed and arranged in a circumferential direction; and a pattern of connection wire elements 18b, which are formed in the circumferential direction to connect the adjacent generation wire elements 18a to each other. The both patterns of the generation wire elements 18a and the connection wire elements 18b are formed like rectangular waves and alternately continued in the circumferential direction. FG signals are outputted from a pair of lead wires 18c and 18d. When the FG magnet 16 shown in FIG. 3 is rotated above the FG pattern 18 of the motor substrate 8, an induced electromotive force is induced in each of the generation wire elements 18a of the FG pattern 18, so that the FG signals can be detected from the pair of lead wires 18c and 18d.

As shown in FIG. 3, a position detecting projection (position detecting section) 16a is radially outwardly projected from a part of the circular FG magnet 16. A circumferential position of the position detecting projection 16a and that of a reference reflective surface (rotational reference surface) are corresponded to each other. A magnetic pole of the position detecting projection 16a may be N-pole or S-pole.

Figure 2:
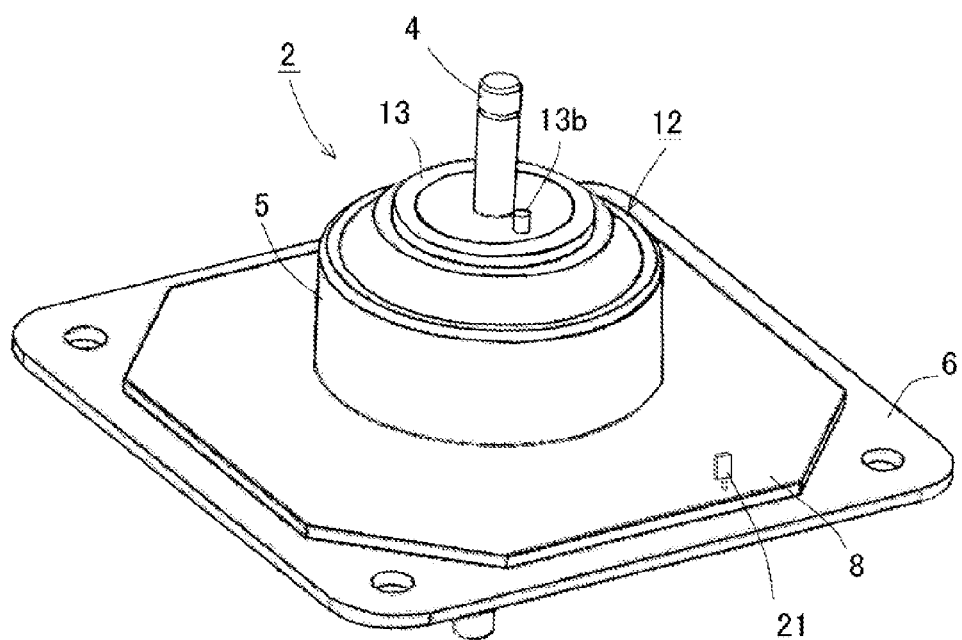
FIG. 2 is a perspective view of the optical scanner shown in FIG. 1, in which a tilt mirror is detached.

As shown in FIG. 2, the position detecting projection 16a corresponds to a circumferential position of a projection 13b of the rotor hub 13. The position detecting projection 16a is radially outwardly projected as shown in FIG. 3. But, the position detecting section of the present invention is not limited to the position detecting projection 16a, so a position detecting projection 16b which is radially inwardly projected from the FG magnet 16 may be formed as the position detecting section. The Hall IC (magnetic sensor) 21 detects a detection signal every time the tilt mirror 3 rotates once from the reference reflective surface. The detected signals are used for controlling a rotational speed or a number of rotation of the tilt mirror 3.

An example of a manner of assembling the optical scanner 1 will be explained. In FIG. 1, the motor 2 is assembled by steps of: attaching the base plate 6 and the motor substrate 8 to the bearing housing 7; attaching the stator 11; and inserting the rotor shaft 4 of the rotor 12 into the through-hole of the bearing housing 7 so as to rotatably hold the rotor shaft 4 by the first and second bearing sections 10a and 10b.

By fitting the projection 13b of the rotor 12 in a recessed part (not shown) of the tilt mirror 3, circumferential positions of the reference reflective surface of the tilt mirror 3 and the circumferential position of the projection 13b of the rotor hub 13 can be aligned, the reference reflective surface of the tilt mirror 3 can be aligned with the position detecting projection 16a of the FG magnet 16, and these members are assembled in this state.

Further, the one end of the rotor shaft 4 is penetrated through the shaft hole 3b of the recessed part 3c formed in the upper surface of the tilt mirror 3, and the press spring 14 and the retaining washer 15 are fitted in the recessed part 3c, so that the tilt mirror 3 can be attached to the rotor shaft 4 and retained thereon. The other end of the rotor shaft 4 is retained, by a retaining washer 20, without being detached from the bearing housing 7 (the second bearing section 10b).

As described above, the position detecting projection 16a or 16b, which corresponds to the reference reflective surface of the tilt mirror 3, is radially outwardly or inwardly projected from the part of the FG magnet 16, which is provided along the outer edge of the end surface of the tilt mirror 3, which acts as the load, facing the motor substrate 8. By making the position detecting projection 16a or 16b correspond to the reference reflective surface of the tilt mirror 3, rotational stability and rotational controllability of the rotary body driving apparatus can be improved.

By disposing the FG pattern 18 shown in FIG. 4, which faces the FG magnet 16 shown in FIG. 3, close to the FG magnet 16, the rotational position of the tilt mirror 3 can be highly precisely detected, so that controllability of the tilt mirror 3 can be improved.

In comparison with a case of providing an FG magnet to a rotor yoke, an outer diameter of the FG magnet 16 can be increased, number of the magnetic poles of the FG magnet 16 can be increased, an outer diameter of the FG pattern 18 can be increased, and numbers of the generation wire elements 18a and the connection wire elements 18b can be increased, so that the rotational position of the tilt mirror 3 can be highly precisely detected.

In the above described embodiment, the rotary body is the tilt mirror 3 having the tilted reflective surfaces 3a. But, the present invention is not limited to the above described embodiment. For example, the rotary body may be a polygon mirror having a plurality of reflective surfaces.

Further, the motor of the above described embodiment is the outer rotor-type motor. The present invention may be applied to the rotary body driving apparatus having an inner rotor-type motor.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alternations could be made hereto without departing from the spirit and scope of the invention.

What is claimed is:

1. A rotary body driving apparatus, comprising:
a rotary body having a plurality of reflective surfaces;
a motor having a rotor shaft;
a rotor being attached to one end part of the rotor shaft together with the rotary body;
a stator housing having a bearing section, which rotatably holds the rotor shaft;
a motor substrate for detecting a rotational position of the rotor, the motor substrate being provided to the stator housing;
a magnetized section for frequency generation, the magnetized section being formed into a ring shape and provided to an outer edge of an end surface of the rotary body facing the motor substrate;
a circular frequency generation pattern, which faces the magnetized section, being provided to the motor substrate and disposed close to the magnetized section;
a position detecting section, which is magnetized and which corresponds to a reference reflective surface of the rotary body, being radially outwardly or inwardly projected from a part of the magnetized section; and
a magnetic sensor, which faces the position detecting section, being provided to the motor substrate.

2. The rotary body driving apparatus according to claim 1, wherein the rotary body is formed into a multiple truncated pyramid shape,
the reflective surfaces are formed in outer surfaces of the rotary body, and
the magnetized section is integrally attached along an outer edge of an axially maximum width part of the rotary body.

3. The rotary body driving apparatus according to claim 1, wherein the magnetized section is integrally attached to the rotary body with a back yoke composed of a magnetic material.

4. The rotary body driving apparatus according to claim 1, wherein the rotary body is a tilt mirror having a plurality of tilted reflective surfaces, or a polygon mirror having a plurality of reflective surfaces, and
the tilt mirror or the polygon mirror is integrally attached to a rotor yoke and retained in an axial direction.

* * * * *